United States Patent [19]

Usui

[11] Patent Number: 4,916,729
[45] Date of Patent: Apr. 10, 1990

[54] MOBILE STATION FOR AN AUTOMOBILE TELEPHONE SYSTEM

[75] Inventor: Hisayoshi Usui, Tokyo, Japan

[73] Assignee: NEC Corporation, Tokyo, Japan

[21] Appl. No.: 355,626

[22] Filed: May 23, 1989

[30] Foreign Application Priority Data

May 23, 1988 [JP] Japan .................................. 63-123892

[51] Int. Cl.⁴ .............................................. H01Q 7/04
[52] U.S. Cl. ........................................ 379/61; 379/63; 379/58; 455/127
[58] Field of Search ................. 379/61, 62, 63, 57; 455/127, 343

[56] References Cited

U.S. PATENT DOCUMENTS

| | | | |
|---|---|---|---|
| 3,962,553 | 6/1976 | Linder et al. | 379/61 |
| 4,458,111 | 7/1984 | Sugihara | 379/61 |
| 4,509,201 | 4/1985 | Sekigawa et al. | 455/73 |
| 4,511,761 | 4/1985 | Yamazaki et al. | 379/61 |
| 4,513,446 | 4/1986 | Leslie | 455/73 |
| 4,544,924 | 10/1985 | French | 340/825.69 |
| 4,591,914 | 5/1986 | Haramada et al. | 358/190 |
| 4,811,421 | 3/1989 | Hauel et al. | 455/69 |
| 4,845,772 | 7/1989 | Metroka et al. | 379/61 |

*Primary Examiner*—Robert Lev
*Attorney, Agent, or Firm*—Sughrue, Mion, Zinn, Macpeak & Seas

[57] ABSTRACT

A mobile station for an automobile telephone system comprises a main unit and a telephone set connected to the main unit, for instance, by a curl cord. The main unit includes a power supply which is turned on from the telephone set, a controller for controlling the power supply to be turned on and off in accordance with a control signal supplied from the telephone set, and a detecting circuit for detecting the separation of the telephone set from the main unit. When the detecting circuit detects the separation of the telephone set from the main unit, the controller controls the power supply to be turned off, even if a power supply turning-off signal is not produced in the telephone set.

4 Claims, 4 Drawing Sheets

FIG. I PRIOR ART

MOBILE STATION FOR AN AUTOMOBILE TELEPHONE SYSTEM

FIELD OF THE INVENTION

The invention relates to a mobile station for an automobile telephone system, and more particularly to a mobile station for an automobile telephone system in which a tephone set connected with a main body can be separated from the main unit.

BACKGROUND OF THE INVENTION

One type of a conventional mobile station for an automobile telephone system comprises a main unit including a radio communication circuit for receiving aural signals, various data, control signals etc. from a base station and transmitting aural signals etc. to the base station, a control circuit for controlling the radio communication circuit etc. to operate in accordance with the control signals, and a power supply for supplying electric power to the circuits; and a telephone set including an operation board with a power-on switch, a key board etc. for turning the mobile station on and off, dialling a telephone number and so on, a display for displaying information supplied from the main unit etc., a receiver and a microphone for a telephone communication, a speaker for producing aural output in accordance with audio frequency signals, and a control circuit for controlling the operation board, the display etc., to operate in accordance with the control signals, wherein the main unit and the telephone set are connected to each other by a cable such as a curl cord.

In operation, the mobile station is turned on by use of the power-on switch in the operation board, so that electric power is supplied from the power supply in the main unit to the radio communication circuit, the control circuit etc. in the main circuit, and through the curl cord to the control circuit, the operation board, the display etc. in the telephone set. Then, a caller (an operator) in a vehicle can dial a telephone number of a callee which is transmitted from the control circuit of the telephone set through the curl cord to the control circuit of the main unit, so that the telephone number is transmitted from the radio communication circuit of the main unit through antennas to the base station. Consequently, the telephone set of the caller is connected through an exchange to a telephone set of the callee. In the same manner, information stored in the base station can be available to the operator.

When operation of the mobile station is finished, a power-off signal of serial data is produced by use of the power-on switch in the operation board of the telephone set, and then transmitted from the control circuit of the telephone set through the curl cord to the control circuit of the main unit, so that the mobile station is turned off in accordance with the shutting-off of the power supply.

In the conventional mobile station for an automobile telephone system, however, there is a disadvantage that the power supply remains turned on in the main unit in a case where the curl cord becomes disconnected to separate the telephone set from the main unit under a state that the power-on switch is turned on in the operation board of the telephone set, in other words, without transmitting the power-off signal from the telephone set to the main unit.

SUMMARY OF THE INVENTION

Accordingly, it is an object of the invention to provide a mobile station for an automobile telephone system in which a power supply is turned off in response to the separation of a telephone set from a main unit.

According to the invention, a mobile station for an automobile telephone system: comprises, a main unit including a radio communication circuit for transmitting signals to an external station and receiving signals from the external station, and a power supply for supplying electric power of a predetermined voltage which is required for operation;

a telephone set including an operation means for turning the power supply on and off, the telephone set being separatable from the main unit;

means for detecting the separation of the telephone set from the main unit; and means for controlling the power supply to be turned off when the detecting means detects the separation of the telephone set from the main unit under a state that a power supply turning-off signal is not produced in the operation means.

BRIEF DESCRIPTION OF DRAWINGS

The invention will be explained in more detail in conjunction with appended drawings wherein.

DESCRIPTION OF PREFERRED EMBODIMENTS

Figure 1:
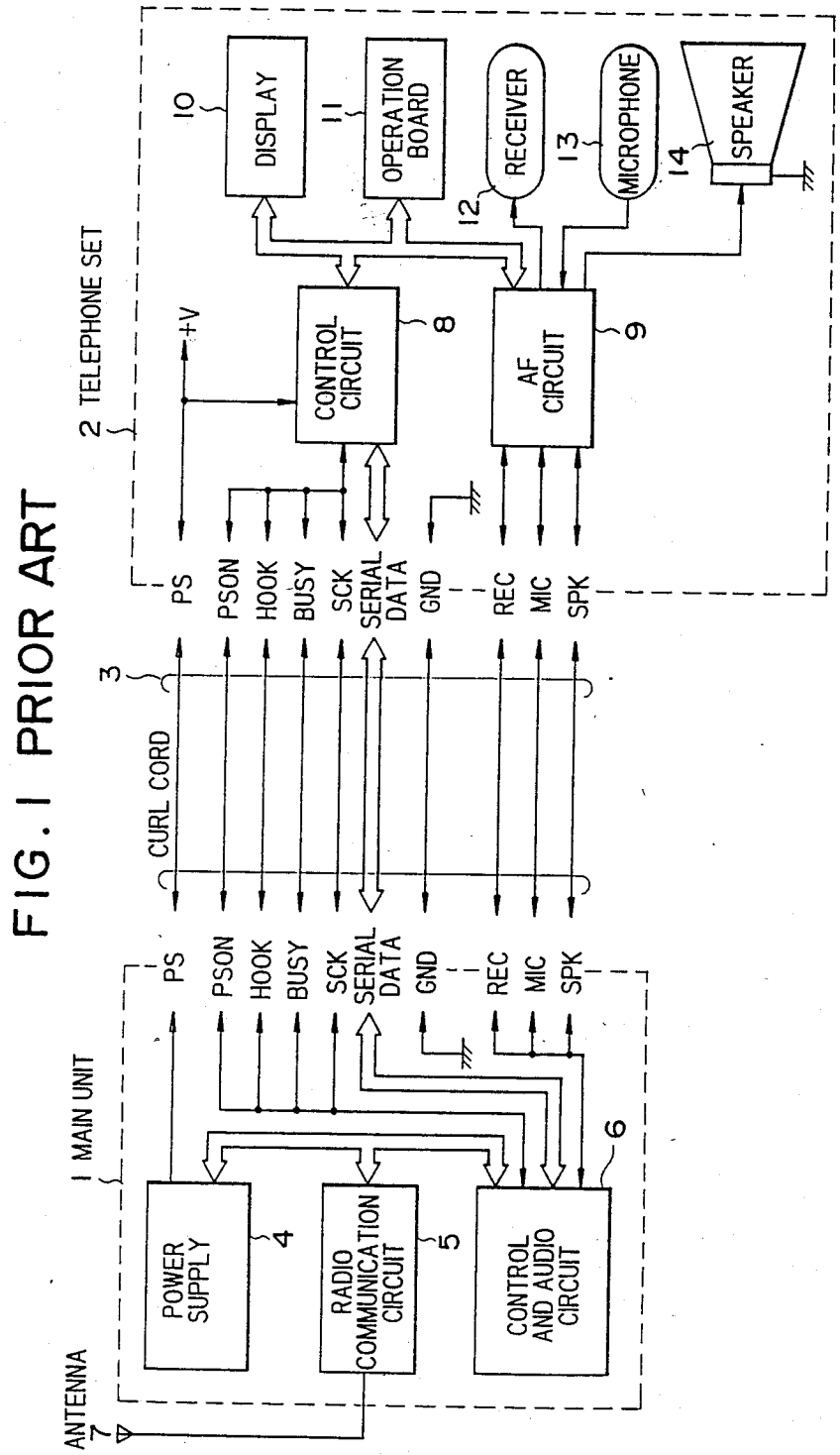
FIG. 1 is a circuitry diagram showing a conventional mobile station for an automobile telephone system.

Before explaining a mobile station for an automobile telephone system according to the invention, the aforementioned conventional mobile station for an automobile telephone system will be explained. FIG. 1 shows the conventional mobile station for an automobile telephone system which comprises a main unit 1, a telephone set 2, and a curl cord 3 for connecting the telephone set 2 to the main unit 1. The main unit 1 comprises a power supply 4 for supplying electric power of a predetermined voltage to respective circuits in the main unit 1 and the telephone set 2, a radio communication circuit 5 for receiving aural signals, various data etc. from a base station (not shown) and transmitting aural signals, a telephone number of a callee etc. to the base station by means of an antenna 7, and a control and audio circuit 6 for controlling the power supply 4 and the radio communication circuit 5 to operate in accordance with control signals received through the radio communication circuit 5 from the base station and the telephone set 2, and producing audio frequency signals in accordance with signals received through the radio communication circuit 5 from the base station. The telephone set 2 comprises a control circuit 8 for controlling respective circuits of the telephone set 2 to operate in accordance with a command of a caller (an operator), and producing control signals supplied to the control and audio circuit 6 of the main unit 1, an audio frequency circuit 9 for processing audio frequency signals, a display 10 of, for instance, a liquid crystal device for displaying various information, an operation board 11 including a key board, a power-on switch etc., a receiver 12 for producing aural information, a microphone 13 for converting voice of the caller (the operator) to aural signals, and a speaker 14 for producing audio frequency information such as music, aural information etc. The curl cord, for instance, fixed electrically to the telephone set 2 and connected to the main unit 1 by means of a connector comprises insulated conductor for providing electric power PS from the power supply 4 of the main unit 1 to the telephone set 2, signal wires for propagating signals such as a power supply turning-on signal PSON, a hook-on and off state signal HOOK, and a busy state signal BUSY between the main unit 1 and the telephone set 2, data bus for propagating serial data therebeween, a ground wire or a grounded shielding layer GND, and signal wires for propagating signals such as receiver, microphone and speaker signals REC, MIC and SPK.

The aforementioned operation and disadvantage etc. of the conventional mobile station of an automobile telephone system are not explained here.

Figure 2:
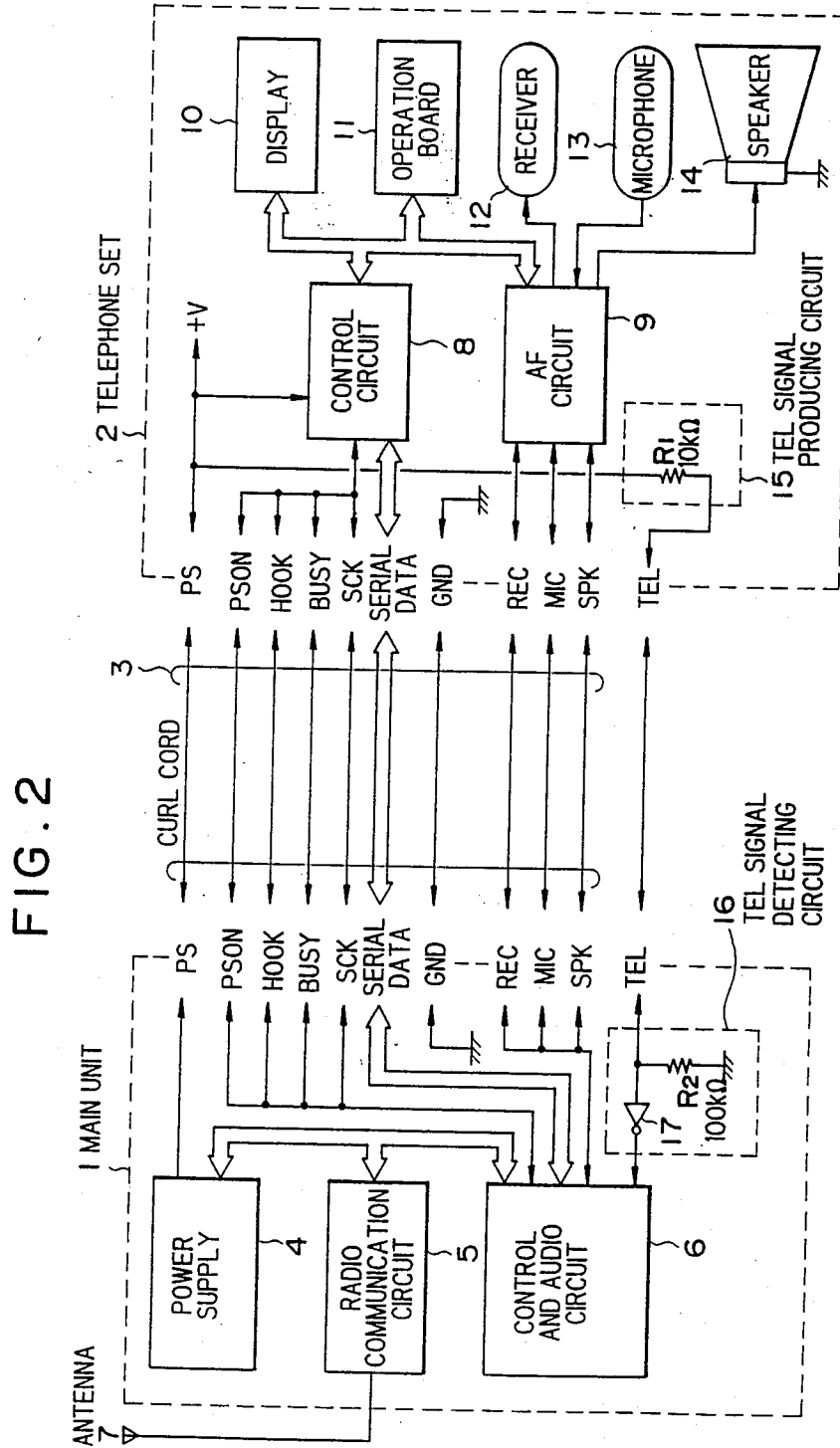
FIGS. 2 to 4 are circuitry diagrams showing mobile stations for automobile telephone systems in first to third embodiments according to the invention.

FIG. 2 shows a mobile station for an automobile telephone system in a first embodiment according to the invention, wherein like parts are indicated by like reference numerals in FIG. 1. In the mobile station for an automobile telephone system, the main unit 1 further comprises a TEL signal detecting circuit 16 including an inverter 17 and a resistance $R_2$ of a high resistance value, for instance, 100 KΩ, and a telephone set 2 further comprises a TEL signal producing circuit 15 including a resistance $R_1$ having a resistance value which is low, for instance, 10 KΩ as compared to the high resistance value. The TEL signal producing circuit 15 is connected at its input to a power source line of a curl cord 3, and at its output to a TEL signal line of the curl cord 3, while the TEL signal detecting circuit 16 is connected at its input to the TEL signal line of the curl cord 3, and at its output to a control and audio circuit 6. The control and audio circuit 6 controls a power supply 4 to be turned off, when a signal of "high" is supplied from the TEL signal detecting circuit 16 to the control and audio circuit 6.

In operation, a power-on switch is turned on in an operation board 11 of the telephone set 2, so that a power supply turning-on signal is supplied from the telephone set 2 through a power supply turning-on signal line PSON of the curl cord 3 to the control and audio circuit 6 of the main unit 1. Consequently, the power supply 4 is turned on, so that electric power of a predetermined voltage is supplied from the power supply 4 to respective parts of the main unit 1 and the telephone set 2. As a result, a signal of "high" is supplied from the TEL signal producing circuit 15 to the TEL signal detecting circuit 16 in which a signal of "low" is obtained at the output of the inverter 16, so that the signal of "low" is supplied to the control and audio circuit 6, thereby controlling the power supply 4 to maintain the power supply turning-on state. Assuming that the curl cord 3 is disconnected from the main unit 1, electric power is not supplied through the curl cord 3 to the telephone set 2. At the same time, a signal of "high" is no longer supplied to the TEL signal detecting circuit 16, so that a signal of "high" is supplied from the inverter 17 to the control and audio circuit 6 because the input of the inverter 17 is connected through the resistance $R_2$ to the ground. Consequently, the power supply 4 is forcedly turned off, even if a power-off signal is not supplied from the operation board 11 of the telephone set 2. Therefore, even if an operator forgets to turn the power supply 4 off, the power supply 4 is automatically turned off concurrently with the separation of the telephone set 2 from the main unit 1. In this embodiment, the TEL signal line of the curl cord 3 may be one of other signal lines of the curl cord 3.

Figure 3:
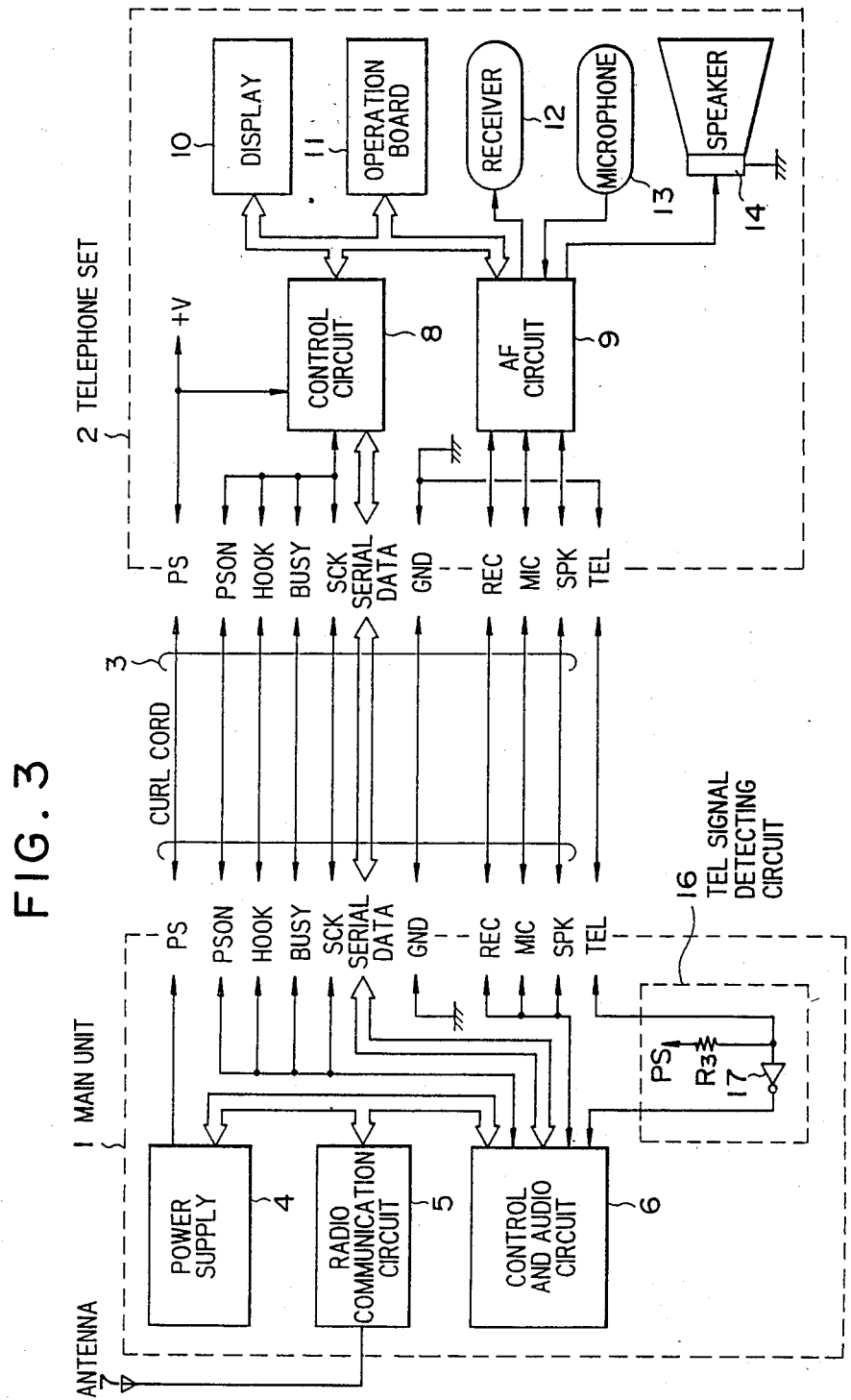

FIG. 3 shows a mobile station for an automobile telephone system in a second embodiment according to the invention, wherein like parts are indicated by like reference numerals in the first embodiment. In the mobile station for an automobile telephone system, the main unit 1 comprises a TEL signal detecting circuit 16 including an inverter 17 which is connected at its input through a resistance $R_3$ to a power supply 4 and at its output to a control and audio circuit 6. On the other hand, the aforementioned TEL signal producing circuit 15 is not provided in the telephone set 2, while a TEL signal line of a curl cord 3 is connected to the ground in the telephone set 2. In this embodiment, the control and audio circuit 6 controls the power supply 4 to be turned off, when a signal of "low" is supplied from the TEL signal detecting circuit 16 to the control and audio circuit 6.

In operation, the power supply 4 is turned on in accordance with a power supply turning-on signal PSON produced on the basis of the turning-on of a power-on switch in an operation board 11 of the telephone set 2, so that electric power is supplied to the main unit 1 and the telephone set 2. On the other hand, the power supply 4 is turned off in accordance with the turning-off of the power-on switch. Under a state that the power supply 4 is turned on, the inverter 17 receives a signal of "low" from the TEL signal line of the curl cord 3, so that a signal of "high" is supplied from the inverter 17 to the control and audio circuit 6, thereby controlling the power supply 4 to maintain the turning-on state. In this situation, assuming that the telephone set 2 is separated from the main unit 1, the inverter 17 receives a signal of "high" because the input thereof is connected through the resistance $R_3$ to the power supply 4, so that the power supply 4 is forcedly turned off, even if a power supply turning-off signal is not supplied from the telephone set 2.

Figure 4:
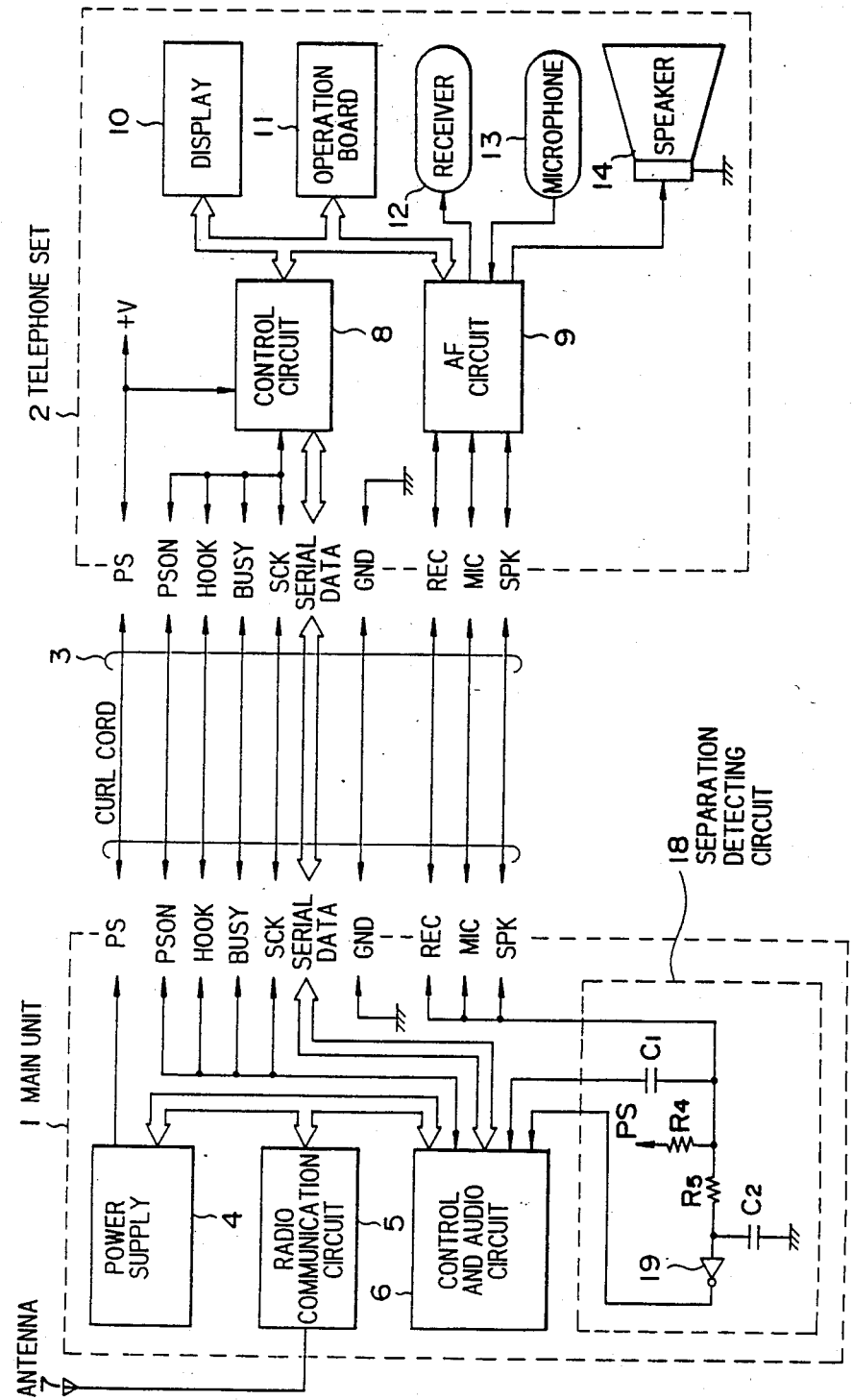

FIG. 4 shows a mobile station for an automobile telephone system in a third embodiment according to the invention, wherein like parts are indicated by like reference numerals in the second embodiment. In the mobile station for an automobile telephone system, a separation detecting circuit 18 which is identical in function to the TEL signal detecting circuit 16 is provided in the main unit 1, while the TEL signal line is obviated to decrease the number of signal lines in a curl cord 3. The separation detecting circuit 18 comprises a resistance $R_4$ connected to a power supply 4, a capacitor $C_1$ for passing only an aural component supplied from a speaker 10 of the telephone set 2, and supplied to a control and audio circuit 6, a resistance $R_5$ and a capacitor $C_2$ for forming a low-pass filter, and an inverter 19 for supplying a separation detection signal to the control and audio circuit 6. In the separation detecting circuit 18, the resistance $R_4$ is provided between the power supply 4 and a speaker signal line SPK of the curl cord 3 connected through an audio frequency circuit 9 to a speaker 14, and has a resistance value much higher than a DC resistance value of the speaker 14. The low-pass filter consisting of the resistance $R_5$ and the capacitor $C_2$ is connected at its input to the speaker line SPK to pass a DC current component of signals flowing through the speaker line SPK.

In operation, under a state that the telephone set 2 is connected through the curl cord 3 to the main unit 1, a voltage of the speaker line SPK is pulled down to be low based on a divided voltage ratio determined by a resistance value ratio of the resistance $R_4$ and the DC resistance of the speaker 14. In this situation, the low-pass filter ($R_5$ and $C_2$) avoids the passing of aural signals flowing through the speaker line SPK. Therefore, a signal of "low" is supplied to the input of the inverter 19, so that a signal of "high" is supplied to the control and audio circuit 6. The control and audio circuit 6 controls the power supply 4 etc. to operate in a telephone set -connecting mode (an ordinary mode) by receiving the signal of "high". On the contrary, assuming that the telephone set 2 is separated from the main unit 1, a voltage of a connecting point of the resistance $R_4$ and $R_5$ is pulled up to be high based on a voltage of the power supply 4, so that a signal of "high" is supplied to the input of the inverter 19. Consequently, a signal of "low" is supplied to the control and audio circuit 6, then, which controls the power supply 4 to be turned off in a telephone set-disconnecting mode (an extraordinary mode). In this embodiment, the speaker signal line SPK is used for the detection of the separation of the telephone set 2 from the main unit 1. Therefore, an exclusive line for detecting the separation of the telephone set 2 from the main unit 1 is not necessary to be provided in the curl cord 3.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A mobile station for an automobile telephone system: comprising,
   a main unit including a radio communication circuit for transmitting signals to an external station and receiving signals from said external station, and a power supply for supplying electric power of a predetermined voltage which is required for operation;
   a telephone set including an operation means for turning said power supply on and off, said telephone set being separatable from said main unit;
   means for detecting the separation of said telephone set from said main unit; and
   means for controlling said power supply to be turned off when said detecting means detects the separation of said telephone set from said main unit under a state that a power supply turning-off signal is not produced in said operation part.

2. A mobile station for an automobile telephone system according to claim 1,
   wherein said detecting means: includes,
   a connecting signal producing circuit which is connected to a power supply line in said telephone set; and
   a connecting signal detecting circuit for supplying a disconnecting signal to said controlling means, said disconnecting signal being a signal to which a connecting signal of said connecting signal producing circuit is inverted.

3. A mobile station for an automobile telephone system according to claim 1,
   wherein said detecting means: includes,
   two inputs, one of which is connected in said telephone set to the ground, and the remaining one of which is connected in said main unit to said power supply; and
   an inverter for inverting a signal determined by a signal state of said two inputs to produce an inverted signal, said inverted signal being supplied to said controlling means.

4. A mobile station for an automobile telephone system according to claim 1,
   wherein said detecting means: includes,
   two inputs, one of which is connected in said main unit to a speaker signal line connecting said main unit and said telephone set, and the remaining one of which is connected in said main unit to said power supply;
   a low-pass filter for avoiding the passing of aural signals supplied from said one of said two inputs, and passing a signal determined by a signal state of said two inputs; and
   an inverter for inverting an output signal of said low-pass fiter to provide an inverted signal, said inverted signal being supplied to said controlling means.

* * * * *